(12) United States Patent
Bransfield

(10) Patent No.: US 10,880,712 B2
(45) Date of Patent: Dec. 29, 2020

(54) MULTIFUNCTION SCANNER AND COMPUTER

(71) Applicant: Eugene Joseph Bransfield, Vienna, VA (US)

(72) Inventor: Eugene Joseph Bransfield, Vienna, VA (US)

( * ) Notice: Subject to any disclaimer, the term of this patent is extended or adjusted under 35 U.S.C. 154(b) by 0 days.

(21) Appl. No.: 16/407,783

(22) Filed: May 9, 2019

(65) Prior Publication Data

US 2019/0268744 A1 Aug. 29, 2019

Related U.S. Application Data

(63) Continuation-in-part of application No. 15/833,820, filed on Dec. 6, 2017, now Pat. No. 10,791,415, which is a continuation-in-part of application No. 14/853,964, filed on Sep. 14, 2015, now Pat. No. 10,277,684.

(60) Provisional application No. 62/553,841, filed on Sep. 2, 2017, provisional application No. 62/050,173, filed on Sep. 14, 2014.

(51) Int. Cl.
| | |
|---|---|
| *G06F 15/16* | (2006.01) |
| *H04W 4/60* | (2018.01) |
| *H04W 48/16* | (2009.01) |
| *G06F 8/33* | (2018.01) |
| *G06F 8/654* | (2018.01) |
| *G06F 8/41* | (2018.01) |
| *G06F 8/61* | (2018.01) |
| *G06F 8/36* | (2018.01) |
| *G06F 3/147* | (2006.01) |

(52) U.S. Cl.
CPC ............... *H04W 4/60* (2018.02); *G06F 8/33* (2013.01); *G06F 8/41* (2013.01); *G06F 8/654* (2018.02); *H04W 48/16* (2013.01); *G06F 3/147* (2013.01); *G06F 8/36* (2013.01); *G06F 8/61* (2013.01)

(58) Field of Classification Search
CPC .................................................... G01S 19/42
USPC ........................................................ 709/227
See application file for complete search history.

(56) References Cited

U.S. PATENT DOCUMENTS

| | | | |
|---|---|---|---|
| 2001/0047514 A1 | 11/2001 | Goto et al. | |
| 2004/0033812 A1* | 2/2004 | Matsunaga | G06F 1/263 455/557 |
| 2004/0113793 A1 | 6/2004 | Braxton | |

(Continued)

*Primary Examiner* — Hamza N Algibhah
(74) *Attorney, Agent, or Firm* — Edward J. Radlo; Radlo & Su

(57) ABSTRACT

A portable programmable computing device 1 containing a memory 14, GPS antenna 12, Wi-Fi component 21, microprocessor 11, and power source 15 housed in a mobile, compact, housing 41. Housing 41 can be a wearable garment, allowing computing device 1 to be hidden within the garment, thus enabling device 1 to communicate with outside devices surreptitiously. Microprocessor 11 can be easily programmed and reprogrammed by a user. Device 1 can connect to the Internet through various means, based on the components contained within or otherwise coupled to device 1, e.g., cellular component 23, Bluetooth component 24, and other wireless protocol (such as Wi-Fi 21) components, to execute various useful functions, including tracking, scanning, and hosting a personal Website. The scanner function is adapted to search for wireless networking access points, and can accommodate a plurality of protocols, including Wi-Fi and Bluetooth.

2 Claims, 9 Drawing Sheets

(56) References Cited

U.S. PATENT DOCUMENTS

| | | |
|---|---|---|
| 2006/0267731 A1 | 11/2006 | Chen |
| 2007/0030824 A1 | 2/2007 | Ribaudo et al. |
| 2008/0088529 A1* | 4/2008 | Tang .................. G02B 27/0172 345/8 |
| 2008/0088937 A1* | 4/2008 | Tang .................. G02B 27/0172 359/630 |
| 2009/0189811 A1 | 7/2009 | Tysowski et al. |
| 2011/0304497 A1 | 12/2011 | Molyneux et al. |
| 2012/0002973 A1 | 1/2012 | Bruzzi et al. |
| 2013/0091197 A1 | 4/2013 | Bar-Zeev et al. |
| 2013/0226692 A1* | 8/2013 | Kouladjie .............. G06Q 30/02 705/14.45 |
| 2013/0318594 A1* | 11/2013 | Hoy .................... H04L 63/0272 726/15 |
| 2014/0070957 A1 | 3/2014 | Longinotti-Buitoni et al. |
| 2014/0094187 A1 | 4/2014 | LaMarca et al. |
| 2014/0095657 A1 | 4/2014 | McLane et al. |
| 2014/0168355 A1 | 6/2014 | Pillarisetty et al. |
| 2014/0172351 A1 | 6/2014 | Barfield et al. |
| 2014/0201532 A1* | 7/2014 | Toy ....................... H04W 12/04 713/171 |
| 2014/0269578 A1 | 9/2014 | Zhong |
| 2014/0344640 A1 | 11/2014 | McLane et al. |
| 2015/0079985 A1* | 3/2015 | Vuchula ................ H04W 48/16 455/435.1 |
| 2015/0103806 A1* | 4/2015 | Kuusilinna ........... H04W 64/00 370/332 |
| 2015/0148868 A1* | 5/2015 | Shahandeh ........ A61N 1/37252 607/60 |
| 2015/0278073 A1 | 10/2015 | Carson et al. |
| 2015/0326610 A1* | 11/2015 | Bartoszewski ..... H04L 41/0813 726/1 |
| 2016/0316500 A1 | 10/2016 | Aliyar |
| 2017/0006095 A1 | 1/2017 | Jiang et al. |
| 2017/0265080 A1 | 9/2017 | Azam et al. |
| 2018/0048674 A1* | 2/2018 | Black .................... H04W 12/06 |
| 2018/0077196 A1* | 3/2018 | Itikarlapalli ........ H04L 63/0245 |

* cited by examiner

Example of User Code Creation and Website Upload Procedures

1.) User wishes to create custom program for the product
2.) User logs into the website with appropriate credentials
    a. User is presented with profile page and list of registered products
3.) User chooses to go to the developer's page
    a. User is presented with an IDE for software creation
4.) User creates the software
5.) User compiles software into a deployable software package
6.) User selects which product to work with
7.) User places the system unit into a flashable state
8.) User chooses "Flash New Software" on the website
    a. User is presented with different software packages to flash to the product
9.) User selects the newly created custom software to flash to the product
10.) User hits "Flash" icon on the website
11.) Product downloads new software, reboots, and is ready for use.

FIG. 4

Example of Basic Wi-Fi Scanning Procedures:

1.) Turn On Wi-Fi chip
2.) Obtain a GPS lock
    a. If no GPS lock, repeat step 2 process until GPS lock
    b. If GPS lock, record date, time, latitude, and longitude
3.) Attempt to detect any Wi-Fi access points in range of the system unit,
    a. If no Wi-Fi signals detected, record none are detected and skip to step 5
    b. if Wi-Fi signals are detected
        i. Record number of SSIDs
            1. For each SSID
                a. Record with the GPS lock information the latitude, and longitude of detected access point, SSID, BSSID, Signal Strength, and Encryption Algorithm, and to memory storage unit
4.) Turn off Wi-Fi chip
5.) Put microcontroller into sleep mode for a specified period of time
6.) Repeat

FIG. 5

Example of Data Upload Procedures:

1.) Start with Spark Core disconnected from Cloud/Internet with Wi-Fi Chip off
2.) Attempt to get GPS lock (including time, date, latitude, and longitude)
   a. Get a GPS lock
      i. If no GPS lock, repeat process until GPS lock
      ii. If GPS lock, get date, time, latitude, and longitude
3.) Turn on Wi-Fi chip
   a. Conduct a Wi-Fi Scan to gather data regarding detected Wi-Fi access points in the area
      i. If Wi-Fi Access point is open or known Wi-Fi access point is in range
         1. Read data from the memory storage unit or firmware and upload to pre-configured website/external storage area
4.) Turn off Wi-Fi Chip.
5.) Microcontroller placed into a sleep mode for a specified period of time (this step is intended to reduce power consumption and can be adjusted or eliminated depending on circumstances).

FIG. 6

Example of Captive Portal Advertisement Procedures:

Note: May require offline pre-configuration of website to be displayed

1.) Start Product with website configuration embedded on device
2.) Turn on Wi-Fi Chip
3.) Broadcast system unit SSID to allow connections to system unit
4.) If device requests connection to system unit
    a. Optional prompt for password
    b. Allow access
5.) Request contact information to access website
    a. Validate proper entry of email address
        i. False: Present error message
        ii. True: Continue
6.) Present website
    a. Optional Bio of representative
    b. Presentation of Coupon or other reward
7.) Logout or timeout after certain period of time
8.) Repeat from step 3

FIG. 9

Example of Captive Portal Convention Procedures:

Note: May require offline pre-configuration of data to be provided

1.) Enable offsite populated database
2.) Start system unit with database communication configuration
3.) Turn on Wi-Fi Chip on system unit and establish connection with offsite database
4.) Broadcast system unit SSID to allow connections to system unit
5.) If device requests connection to system unit
    a. Optional prompt for password
    b. Allow access
6.) Present data from central database
    a. Description of company
    b. Job listings
    c. Information for download
    d. Opportunity to upload resume to database
7.) Logout or timeout after certain period
8.) Repeat from step 4

FIG. 10

MULTIFUNCTION SCANNER AND COMPUTER

RELATED PATENT APPLICATIONS

This patent application is a continuation-in-part of commonly owned U.S. patent application Ser. No. 15/833,820 filed Dec. 6, 2017, which is a continuation-in-part of commonly owned U.S. patent application Ser. No. 14/853,964 filed Sep. 14, 2015, which issued as U.S. Pat. No. 10,277,684 on Apr. 30, 2019; the instant patent application further claims the priority benefit of commonly owned U.S. provisional patent application Ser. No. 62/050,173 filed Sep. 14, 2014 and the priority benefit of commonly owned U.S. provisional patent application Ser. No. 62/553,841 filed Sep. 2, 2017; all four of these previously filed patent applications are hereby incorporated by reference in their entireties into the present patent application.

TECHNICAL FIELD

The present invention is a mobile, small form factor, multifunction computing device containing a microcontroller (microprocessor) connected to a Wi-Fi access device, a GPS unit, and a memory card.

BACKGROUND ART

Current Internet of things (IoT) devices tend to be designed for a single, specific use, or require extensive programming capabilities to modify the intended use. The present invention addresses the shortcomings of conventional mobile IoT devices currently available to users. The invention is a multipurpose and easily reprogrammable IoT device. Functions include tracking, scanning, and hosting a personal Website.

DISCLOSURE OF INVENTION

The present invention 1 comprises a microcontroller 11, memory card 14, and at least one wireless communications access unit 21-24 in a small, portable housing 41 that can be easily carried or worn by a human, a non-human animal, or a robot. The invention 1 can be incorporated in an unmanned drone, a manned aircraft, a self-driving terrestrial vehicle, or a manned terrestrial vehicle. Some examples of suitable housings 41 include an animal collar, ID lanyard, nametag, and clothing items such as shirts, belts, hats, and other wearable items, including undergarments such as corsets. Each instantiation of the present invention is called a system unit 1. A system unit 1 can be hidden within its housing 41; this enables surreptitious communications between unit 1 and outside devices. Microcontroller 11 is configured to perform a base set of functions, and is programmable to allow a user to change the behavior of the corresponding system unit 1. Additional peripherals can be added to unit 1 to alter system functionality. System unit 1 can communicate using a plurality of communications protocols including, but not limited to, Wi-Fi, cellular devices, software-defined radio, short-range radio, long-range radio, Bluetooth™, and Near Field Communication (NFC). System units 1 can also connect, control, and otherwise interact with each other 1 and with one or more third party devices.

BRIEF DESCRIPTION OF THE DRAWINGS

FIG. 4 illustrates an example of a method for creating and flashing a user created program to a system unit 1.

FIG. 5 illustrates an example of a Wi-Fi scanning procedure that system unit 1 is adapted to perform.

FIG. 6 illustrates an example of a data upload procedure.

FIG. 9 illustrates an example of a captive portal advertisement procedure usable in conjunction with the present invention.

FIG. 10 illustrates an example of a captive portal convention procedure usable in conjunction with the present invention.

DETAILED DESCRIPTION OF PREFERRED EMBODIMENTS

Figure 1:
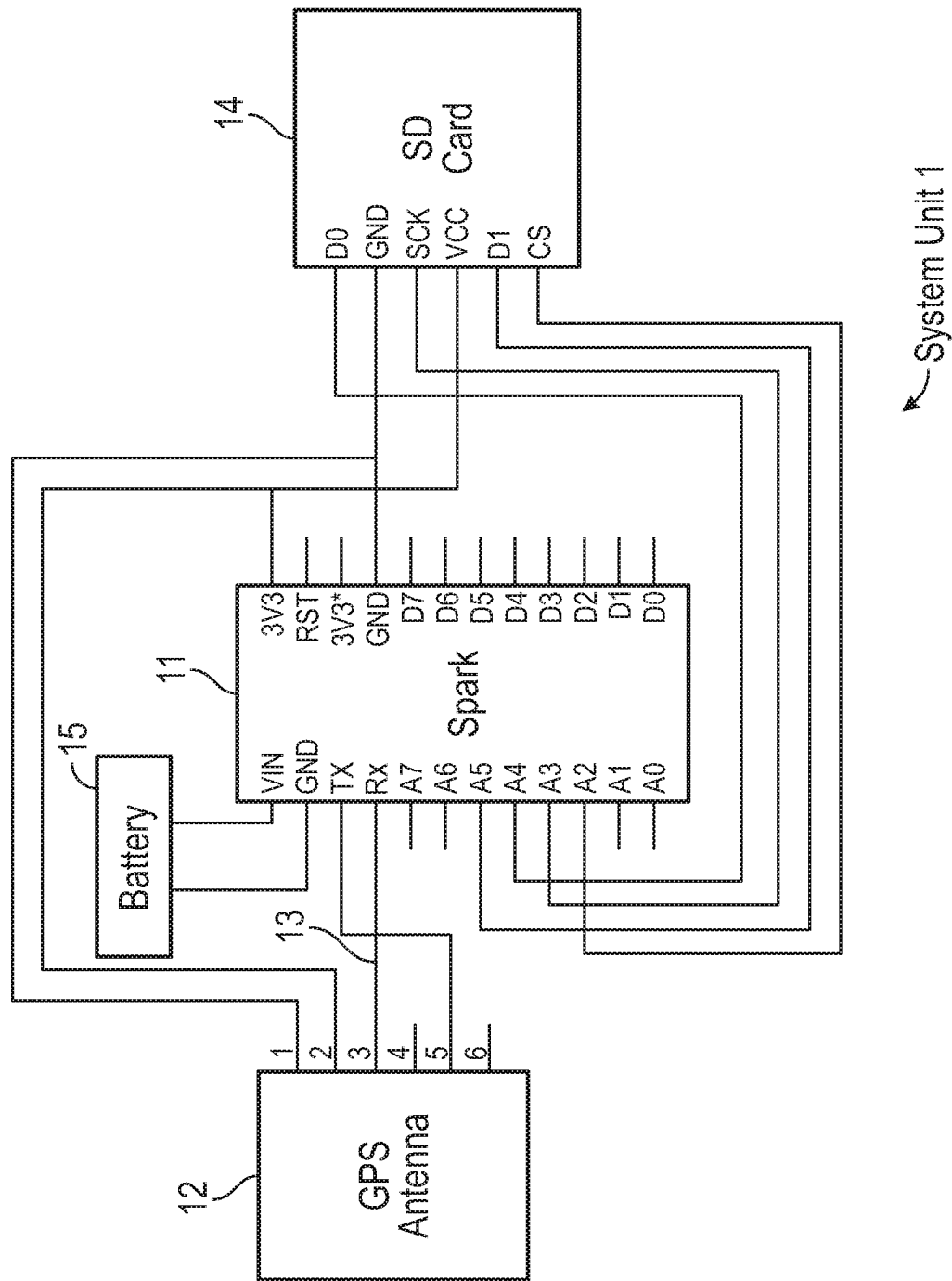
FIG. 1 illustrates an embodiment of the present invention in which components 12-15 are connected directly to a Spark microcontroller 11.

A specific example of a portable system unit 1 utilizes a Spark Core microcontroller 11 with an embedded TI CC3000 Wi-Fi solution; a GP-635T GPS Antenna 12, JST SH Jumper 6-wire 13 (1 ft); a MicroSD Breakout Board 14; and an appropriate power source such as battery 15. A block diagram of this embodiment is displayed in FIG. 1. Alternative components can be substituted in, such as different antennas 12, microcontroller 11 boards, and connection solutions. The microcontroller 11 and alternative components can be replaced with a system on a chip (SOC) or a System in a Package (SOP). The Spark Core microcontroller 11, which is programmable, is connected to a GP-635T GPS antenna 12 via the RX connector on the Spark Core 11 to Pin 3 on the GP-635T GPS (Global Positioning System) antenna 12. The GPS antenna 12 gets power from the Spark Core 11 by connecting GPS antenna Pin 1 to the Spark Core GND connection, and GPS antenna Pin 2 to the Spark Core 3V3 connection. Optionally, GPS antenna Pin 5 can be connected to the Spark TX pin. The GPS antenna 12 listens to radio transmissions broadcast from the fleet of GPS satellites orbiting the earth. The GPS antenna 12 feeds that information via the serial connection to the RX pin on the Spark Core microcontroller 11. In some embodiments, TinyGPS++ software libraries on the Spark Core 11 translate that information into date, time, latitude, and longitude. In some embodiments, the information comprises acceleration, altitude, direction, and/or other pertinent location and movement data.

The Spark Core microcontroller 11 connects to the SparkFun MicroSD Breakout Board 14 by connecting the Spark Core A5 pin to the Breakout Board DI chip; connecting the Spark A4 chip to the Breakout Board DO pin; connecting the Spark A3 pin to the Breakout Board SCK pin; connecting the Spark Core A2 pin to the Breakout Board CS pin; and providing power by connecting the Spark Core GND to the Breakout Board GND and the Spark 3v3 pin to the Breakout Board VCC pin. In some embodiments, the SD card 14 is utilized to record data collected by the cognizant application program(s). In some embodiments, the SD card 14 is utilized to store data for later upload to the Internet, or to store code to allow other functionality performed by the program. A system unit 1 includes appropriate connection of all components, such as by soldering. Configuration of a system unit 1 also includes arrangement of components to fit inside an appropriately-sized container or housing 41 that is compatible with an intended recipient object.

The Spark Core microcontroller 11 allows a wide range of coding possibilities, including uploading information to the Internet, hosting a Web server, and executing code resident on a memory portion of card 14. The uses for system unit 1 are limited only by the storage capabilities of unit 1, and the ingenuity and skill of the developer(s).

Additional application databases for programming system unit 1 can be contained on a Website or external physical database. An external database allows users to create solutions to meet their needs without burdening every system unit 1 with applications for developing or modifying programming. This embodiment also makes applications available to a wider audience in a central repository such as a Website.

In some embodiments, the central repository can be an application store ("app store"), and functions as a digital distribution platform of applications to users. An online embodiment of an app store allows users to browse different app categories and types, and to view information regarding the apps, such as description of designed functionality, reviews, and rating. Users can also acquire these apps from the app store, either for no cost or for purchase. The app store can include functionality to assist in the installation of the app, such as removing previous versions of the app, and in some embodiments help assist against infestation of unit 1 by malware. User designed apps and programs can also be uploaded to the app store for distribution to third parties.

Figure 2:
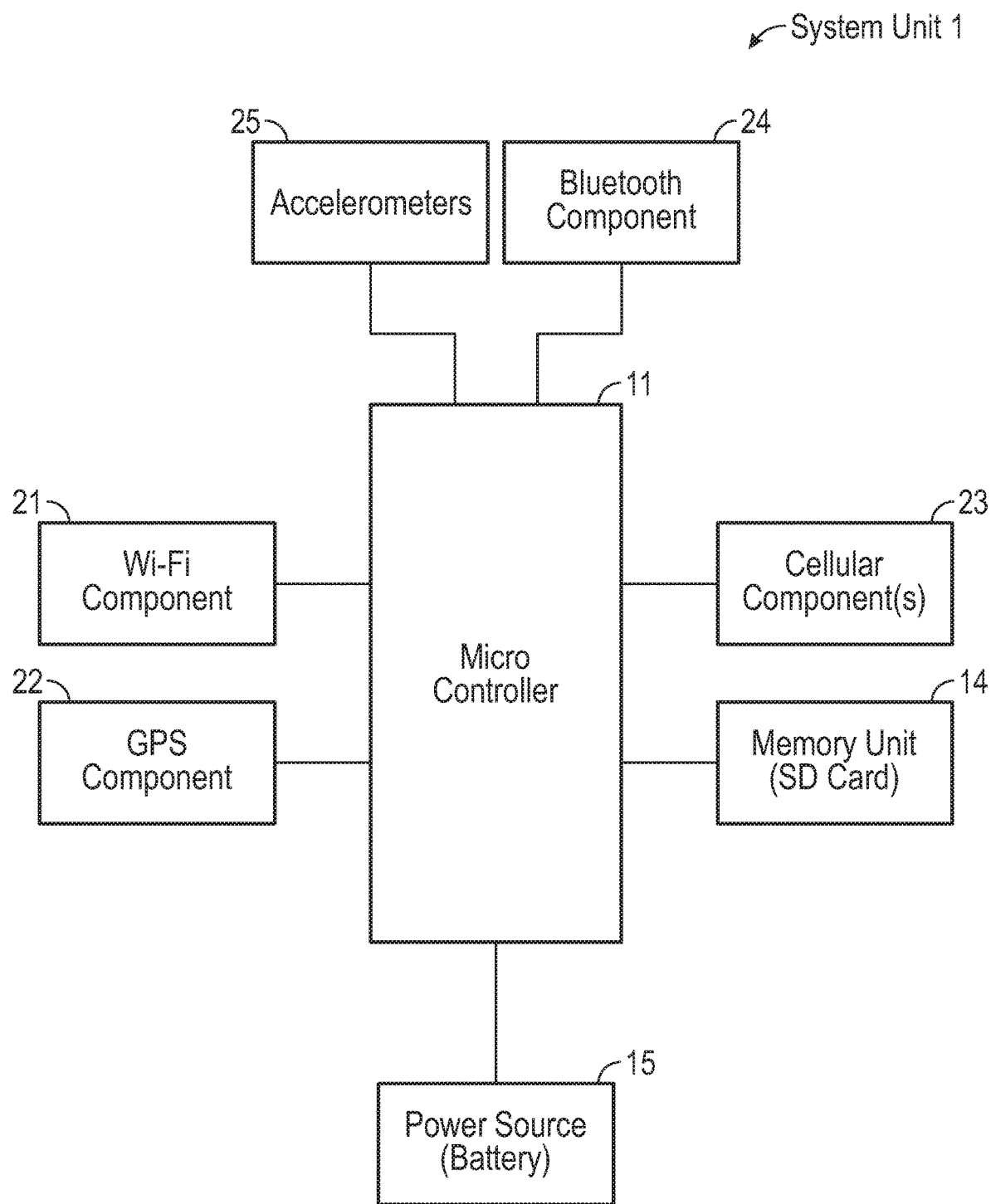
FIG. 2 is a block diagram of a system unit 1.

With reference to FIG. 1, in some embodiments, microcontroller 11 comprises a Spark Core or an Arduino microcontroller; and unit 1 further comprises a component 21 for Wi-Fi capability such as a Texas Instruments CC3000; a component 22 for GPS capability such as one comprising a GP-635T GPS antenna 12; a small memory storage unit incorporated in a Micro SD card 14, which may be removable for accessing data on the memory if necessary; and a battery power source 15, which renders unit 1 portable. In some embodiments, other components can be added, replaced, or omitted as applicable, such as a cellular communications component 23, indicator lights (not illustrated), a Bluetooth™ component 24, accelerometers 25, and/or a NFC component (not illustrated). FIG. 2 illustrates how components, such as a Bluetooth™ component 24 and accelerometers 25, may be connected directly to microcontroller 11 in addition to basic system unit 1 components previously mentioned. Components may be connected to each other. Components may be in a series or parallel configuration with respect to each other or to the microcontroller 11. The components together have a small form factor (size), enhancing the portability of system unit 1. The form factor is small enough such that system unit 1 can be hidden from view when integrated into larger structures, i.e., unit 1 is small enough to fit inside a collar worn by a cat or dog, or fit inside or be attached to a watch band, hat, or lanyard worn by a human person.

Methods for accessing information from the memory storage unit 14 are generally through wireless means; however, direct physical access to the memory storage unit 14 is also an option in certain embodiments. Physical access can be achieved by removing the memory storage unit 14 from unit 1, and inserting unit 14 into an appropriate memory card reader to access the data contained on the memory card 14 if wireless access is inoperable or otherwise not employed. For wireless access, the Wi-Fi component 21 can be used. In some embodiments, system unit 1 can include alternative wireless communication protocols or components allowing access to data resident on memory storage unit 14. Each wireless access method can allow for data transfer to and from the system unit 1 to external repositories, such as the Internet, external computers, or external physical databases such as hard drives. In some embodiments, data can be transmitted by Wi-Fi component 21 using Virtual Private Networks. Wireless communication methods can also be used to access system unit 1 components other than unit 14, including the microcontroller 11, GPS component 22, and any other components that are part of system unit 1. This allows for reprogramming of components, retrieving data from sensors, and sending data to any of the components contained within system unit 1. These physical and wireless communications means can also be used to send commands to system unit 1 to initiate testing sequences or to change settings in system unit 1. System unit 1 components containing wireless capabilities can also communicate with each other within a single system unit 1. In some embodiments, a system unit 1 can communicate with other system units 1 through wireless communications means to relay instructions, programs, or data to between or among system units 1.

Microcontroller 11 can be programmed to perform multiple functions. Instructions contained in memory storage unit 14 can be executed each time microcontroller 11 accesses memory storage unit 14. Instructions can also be executed when access is initiated by another program, or upon the occurrence of a pre-specified event. Examples of events that can trigger the execution of programs include passage of a preset period of time, movement of a set distance, and/or a sensor activation. Programs include hardwired applications, software, and firmware contained on microcontroller 11, memory storage unit 14, or other system unit 1 components.

A feature of this invention is the ease with which it can be reprogrammed by a user. In some embodiments, users with sufficient knowledge can create customized code to reprogram a system unit 1 by conventional programming means. In other embodiments, a system unit 1 can be connected to a software module that allows for selection of pre-programmed applications or application components to add, remove, or modify specific functionality, or to build new functionality. This embodiment allows people without extensive programming capabilities to develop customized programs to meet their own needs. The applications can be contained in a central location, such as a Webserver or database that users can connect to through proprietary software or through a Website interface. The proprietary software can be an app store program. Additionally, applications can be provided to the users by other methods, such as by e-mail or preprogrammed memory storage units 14. A central database can be enabled to allow users to upload their own applications to share with other users.

Figure 3:
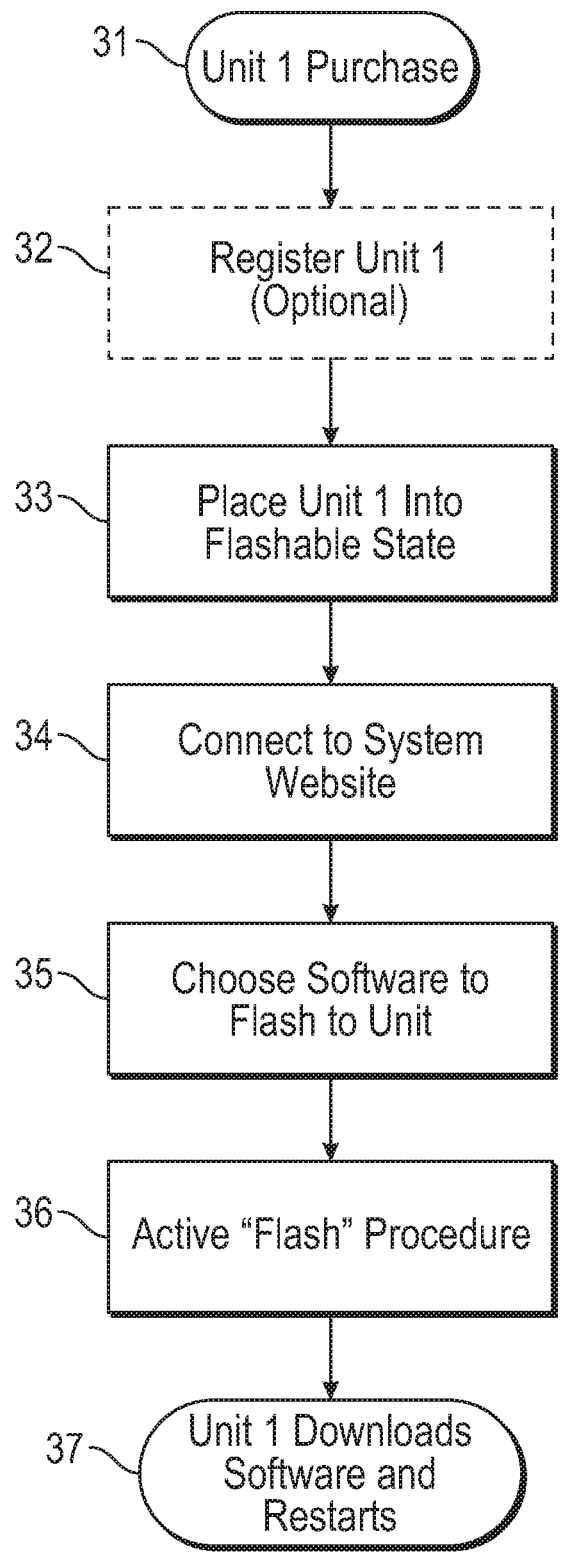
FIG. 3 illustrates an example of a method for programming a system unit 1.

An exemplary embodiment of steps for programming a system unit 1 are illustrated in FIG. 3. A user who purchases 31 a system unit 1 registers 32 the unit 1 on a product registration Website. The user places 33 the unit 1 in a state where the product is ready to flash (install and alert the user) to new programming. This can be a manual process, or unit 1 can be programmed to have an automatic setting contained in the microcontroller 11 or data storage unit 14 that triggers any time the system unit 1 is connected 34 to the product registration Website. On the Website, database, or app store, the user is presented with different software, applications, and/or application add-ons to choose from 35. Selection can be by any conventional means used to select options on a Website, including drag and drop, selection from a check list, and drop down menus. The user chooses 35 appropriate software to flash to the product 1. The user selects 36 to flash to the new software. The system unit 1 receives 37 the new programming, installs it, and reboots unit 1, which is now ready for use.

If a user wishes to re-flash to a different software, applications, or purpose, the steps are near identical to those previously mentioned and outlined in FIG. 3. The user simply connects to the database or Website from where he or she wishes to obtain the application, selects the application, and flashes the new application to system unit 1.

A user may follow the exemplary embodiment of FIG. 4 for creating and flashing a user created program to a system unit 1. To create custom software or code, a product Website or server with standard selection processes used on a Website can be used for selecting application features to be combined to create a program. Traditional programming methods can be used to create a program or desired features if those features are not available on the Website.

Alternative to using a development section on the Website, if a programmer has already created code, the programmer can simply copy and paste, or otherwise upload, the code to the Website through normal methods. Any time a user desires to use the custom created code, the user can do so through the same method as any accessing or reprogramming to an application or software already resident on the product Website.

Another method for loading custom programming onto a system unit 1 is by loading a programming interface on a local computer. This method allows for reprogramming of a system unit 1 when connections to the product Website cannot be established. In this instance, the user does not establish a connection to the product Website, but establishes a connection between the system unit 1 and the location where the application to be flashed to is resident. This can be established by programming the new application, or by previously downloading the desired applications to the local computer. Transfer of applications from the local computer to the system unit 1 can be achieved through physical connection, loading the applications onto memory card 14 and inserting it in system unit 1, or by wireless connection to system unit 1.

An important function of the present invention, outlined in FIG. 5, is to conduct scanning for Wi-Fi signals and Wi-Fi access points. When the Wi-Fi scanning procedure is initiated, the Wi-Fi component 21 is enabled, assuming component 21 has not already been enabled by another program. Microcontroller 11 obtains a GPS lock on a Wi-Fi signal by means of GPS antenna 12, and records the time when a GPS lock is obtained. If a GPS lock cannot be obtained, system unit 1 can record each attempt and any ancillary pertinent information. Pertinent information can include date and time of each attempt; and alternative location information, such as locations derived from accelerometers 25 to determine distances that unit 1 has traveled from the previous GPS lock, a known location, or locations computed by other means, including triangulation from transmitters such as known Wi-Fi access points and/or cellular towers. System unit 1 can be programmed to either skip to step 4 of FIG. 5, or to continue with step 3 of FIG. 5 after a specific number of failed attempts to obtain a GPS lock.

During the scanning procedure, Wi-Fi component 21 scans the local geographical area to determine if any Wi-Fi access points are within range of system unit 1 (step 3 of FIG. 5). This determination is made when component 21 receives a radio signal that matches the type of signal that is associated with a Wi-Fi access point. Any information that is detected, plus the corresponding GPS lock information, is recorded, e.g., within memory unit 14. If no radio signals corresponding to Wi-Fi access points are detected by component 21, this fact is recorded. When one or more Wi-Fi signals are detected, unit 14 records the number of SSIDs detected, plus additional pertinent information, including the SSID, BSSID, signal strength as measured at the geographical location of system unit 1, and the encryption algorithm if any, for each Wi-Fi signal detected. Once the scan is complete, Wi-Fi component 21 is disabled, whereupon microcontroller 11 can be placed into a sleep state for a specified period of time to conserve energy, assuming that microcontroller 11 doesn't have any other pending tasks to perform. Once a specific period of time has passed, the procedure can be run automatically again.

The Wi-Fi scanning procedure can be set to run at different time intervals, which intervals may be preselected, and/or be triggered by specific preselected events. If no GPS lock is obtained (regardless if step 3 of FIG. 5 was skipped) when the system reaches step 5 of FIG. 5, microcontroller 11 can be placed into sleep mode for a shorter time period than if a GPS lock was obtained. Alternatively, if another program was active when the Wi-Fi scanning procedure was initiated, system unit 1 can be returned to the state it was in prior to initiation of the scanning procedure, including the state of microcontroller 11 and Wi-Fi component 21. The Wi-Fi scanning procedure can be conducted as normal if no GPS lock is obtained, proceeding with step 3 of FIG. 5, and upon reaching step 4 can continue to attempt to obtain a GPS lock. The Wi-Fi scanning procedure can also be used in combination with other procedures, such as the data upload procedure described in FIG. 6.

System unit 1, upon completing step 3 of FIG. 5, can then initiate the data upload procedure of FIG. 6. Certain steps can be skipped, such as step 1 of FIG. 6. The data upload procedure can begin with step 2 or with step 3(a)(i) of FIG. 6 if an open or known Wi-Fi access point is within range of unit 1 during the Wi-Fi scanning procedure. Microcontroller 11 can then continue to complete some or all of the data upload procedure steps, and return to the Wi-Fi scanning procedure, or to another program.

FIG. 6 illustrates an exemplary method in which a system unit 1 contains a programmed function for uploading data to a repository not resident on system unit 1, through a Wi-Fi connection. This function can be repeated periodically or triggered by preselected events. In this embodiment, system unit 1 contains Wi-Fi capability 21 and programming for detecting and connecting to Wi-Fi access points that system unit 1 detects. Generally, the default mode is that Wi-Fi connectivity is turned off to conserve power; this, however, is not mandatory. System unit 1 attempts to obtain a GPS lock upon initiation of the upload process. If a GPS lock is not initially obtained, system unit 1 can re-attempt to obtain a GPS lock. Programming can set a preselected number of allowable unsuccessful attempts, after which system unit 1 aborts the upload procedure. System unit 1 can record the fact that it was unable to execute the upload procedure, and further record any pertinent information regarding the failed attempt(s). The next time that system unit 1 completes an upload procedure, it can be programmed to provide the information regarding any of the previous failed upload attempts, in addition to the current information to be uploaded at that time.

Alternatively, if system unit 1 cannot obtain a GPS lock, unit 1 can be programmed to continue with the upload procedure, moving to step 3 of FIG. 6. The microcontroller 11 initiates the Wi-Fi capability. Wi-Fi component 21 scans for any Wi-Fi signals and access points within geographical range of the system unit 1. If detected, system unit 1 can then connect to any open or known access point to conduct the upload. "Known access points" are access points for which system unit 1 has access credentials. Once a Wi-Fi connection is established, microcontroller 11 reads the data to be uploaded from memory storage unit 14 or other components, and uploads the data to the non-resident storage area or Website. If a GPS lock was not established, system unit 1 can provide any available pertinent information and indicate it was unable to establish a GPS lock. Once the upload is complete, or if no open or known Wi-Fi access points are in range, system unit 1 can continue to step 4 of FIG. 6, disable the Wi-Fi capability, continue to step 5 of FIG. 6, and place microcontroller 11 into sleep mode to conserve power until another upload procedure or function is initiated.

As an alternative or additional step, if system unit 1 is unable to establish a Wi-Fi connection, system unit 1 can attempt to establish communications connection using another component or protocol, such as a cellular (telephone) connection, to upload data to the Internet. Changes to the procedure contained in FIG. 6 can include changes to steps 3 and 4 such that the specific protocol component was enabled. as opposed to Wi-Fi component 21. The procedure outlined in FIG. 6 can be repeated as many times or as often as needed.

Certain steps of the exemplary procedures described herein can be omitted for any reason. For example, microcontroller 11 need not be placed into sleep state upon completion of a data upload. Alternative to step 5 in FIG. 6, if another program was utilizing microcontroller 11 prior to the upload procedure being initiated, system unit 1 can return microcontroller 11 to the state it was in prior to initiation of the upload procedure. System unit 1 can also be designed to initiate an action to upload data based upon pre-selected events instead of specific time periods. In this embodiment, microcontroller 11 can optionally be placed into sleep mode to conserve power while sensors continue to function or to allow microcontroller 11 to continue in a normal functional state while executing other programs. Sensors that do not require the function of microcontroller 11 can include sensors such as a thermometer which can open or close a circuit based upon changes in temperature. This circuit opening or closing can initiate the functioning of microcontroller 11 and/or trigger other programs to execute. Using small mechanical components can aid in extending the useful life of the power supply 15 while adding additional functionality to the system 1.

A system unit 1 can also download data in addition to uploading data. When an upload connection is established, the connection can be a two-way connection to allow data to be communicated back to the system unit 1. When a communication component or protocol is active, a system unit 1 can be communicated to through the appropriate means. This can include automatic download of instructions each time system unit 1 detects an open or known Wi-Fi connection, a Bluetooth™ connection, or other wireless data connection. Alternatively, communication components on system unit 1 can be activated remotely. A system unit 1 that includes cellular communications capabilities, or other communications capabilities that include a standby receive mode, can be in such a state to await incoming communication requests that activate the pertinent component and the system unit 1. When a connection is established, system unit 1 can receive data, programming, or control signals that are downloaded to system unit 1. Establishing an incoming communication request can also activate other components, functions, or procedures. Activated functions or procedures can include the contacted system unit 1 to request a GPS lock, record the time, date, and location of system unit 1 when the incoming communication request is received, and/or activate a data upload via the same method or different method as the incoming request.

System units 1 can interact with each other. A system unit 1 can be programmed to detect other system units 1 and establish communication channels or execute other functions upon detection of another system unit 1. The various system units 1 can interact and exchange information between or among each other, and/or notify the corresponding user(s), and as such units 1 are not limited to interacting with external, non-system third party devices. Information that can be communicated between or among system units 1 can include how close two units 1 are to each other, the relative bearings of the units 1, relative motion of the units 1, and/or data contained on a system unit 1. The exchange of information can be programmed to be unidirectional with respect to some sets of information and bi-directional with respect to other information. System units 1 can be programmed with hierarchical relationships, such that specific units 1 are authorized to request or provide certain information, and others 1 are authorized to provide responses to the requests.

Figure 7:
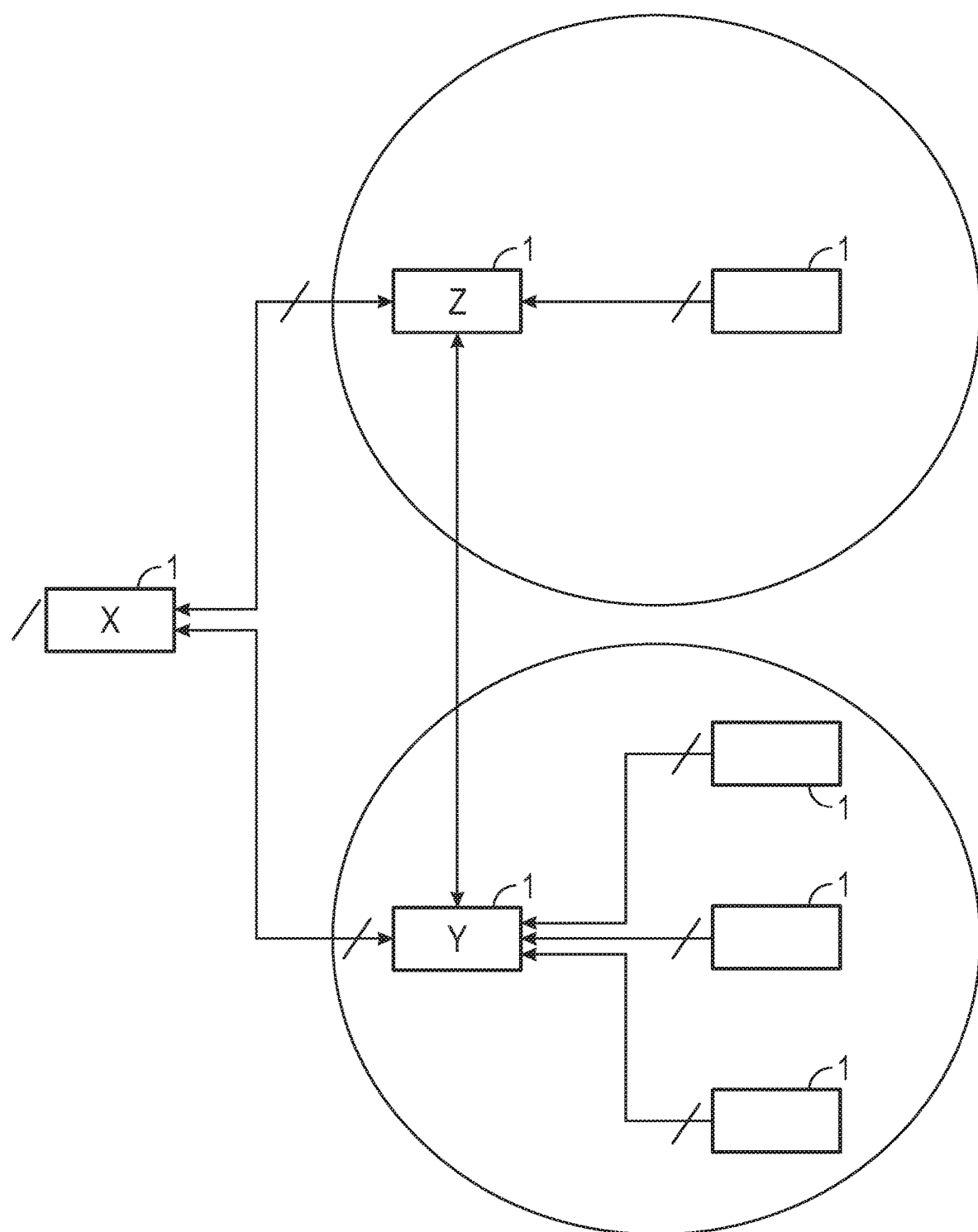
FIG. 7 illustrates an embodiment of the present invention comprising a three tier configuration of system units 1.

FIG. 7 illustrates an exemplary three-tier configuration of system units 1. The top tier comprises a senior system unit X, and the middle tier comprises two area system units: Y and Z. Each area system unit 1 can have one or more subordinate system units 1. At times, an area unit 1 may have no subordinate units 1 within its area. When a system unit 1 enters said area or comes within a preselected proximity to the area or to a unit 1 in said area, one or more subordinate units 1 provide preprogrammed information, or information requested by a requesting area unit 1, to the designated recipient area unit 1. Area units 1 can communicate with other area units 1 or with units 1 higher in the hierarchy. Alternative configurations can be used, depending on preselected requirements. Multiple components can be used to exchange information, and information can be sent by one method or medium and received by the same or different method or medium. Each microcontroller 11 can select which communications protocol and components to use. Communication means can be based on energy efficiency, security needs, or whatever means are currently operational if one or more unit 1 is not functioning properly. For example, data can be transmitted via Wi-Fi at long distances, but when in closer proximity, Bluetooth™ or NFC can be used instead. Alternatively, a microcontroller 11 can be programmed to communicate specific data or to execute specific programs only when specific communication methodologies are available.

Figure 8:
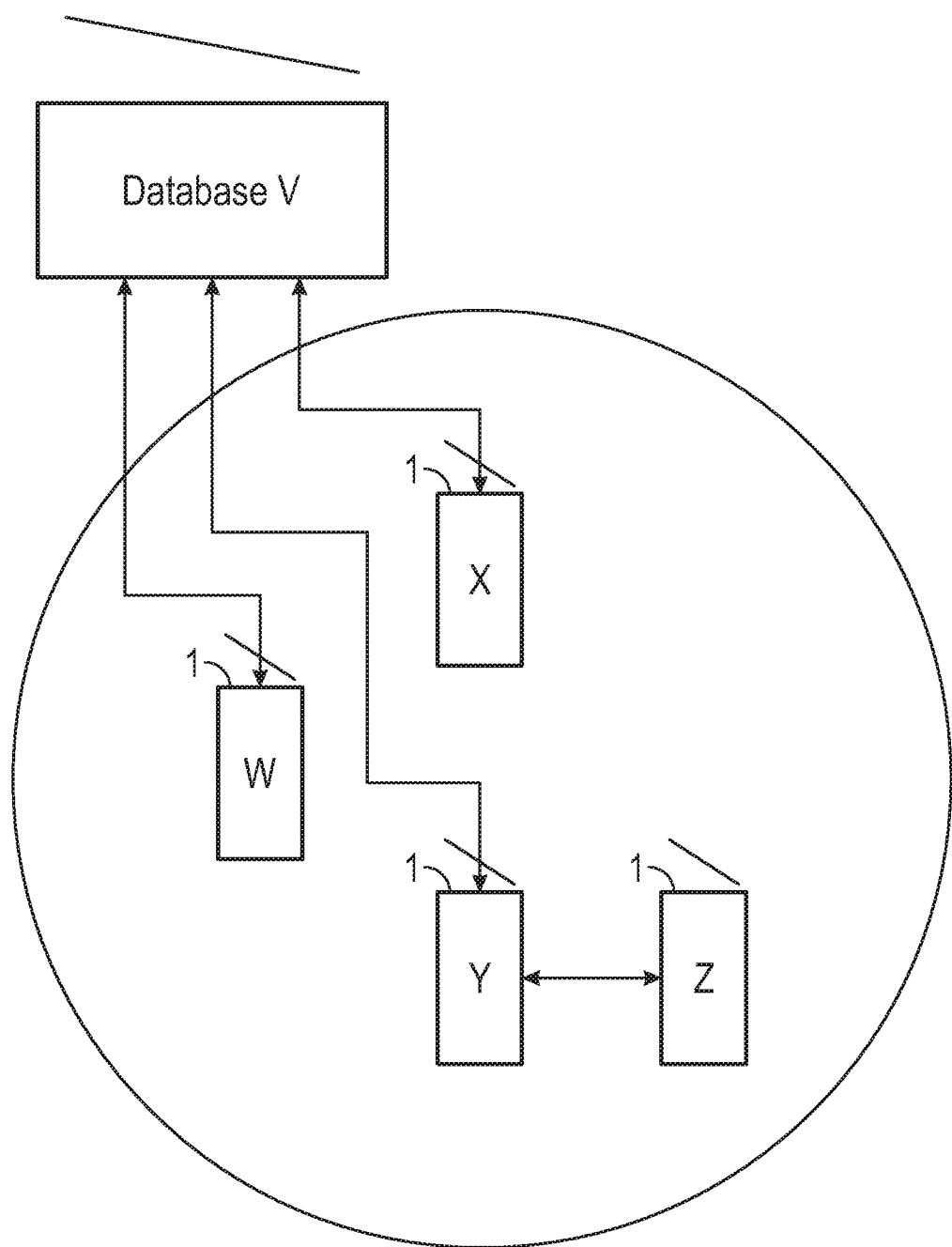
FIG. 8 illustrates an embodiment of the present invention in which a system unit 1 is used a relay to reach other system units 1.

Communication between or among units 1 can be used as a relay to reach units 1 that other methods cannot use. If a communication attempt is made to a specific unit 1, for example system unit 1 Z in FIG. 8, but unit Z cannot be reached directly, a request can be sent to other units 1 in an area that system unit 1 Z was last known to be in. These units 1 can then attempt to contact system unit 1 Z through the same or alternative communications methods. An example includes establishing a cellular data connection from database V to system units W, X, and Y which are near the last known location of system unit 1 Z. Each of these units 1 then attempts to reach system unit 1 Z via Wi-Fi. If another system unit, system unit Y, establishes connection with system unit 1 Z, system unit Y can act as a relay for direct communication between database V and system unit Z. Similarly, a location request for a unit 1 can be sent out, and units 1 that can communicate with a unit 1 unable to receive direct communication from the requesting unit 1 can forward the request(s) and communication responses, or can triangulate a unit 1 if they are able communicate with it.

FIG. 9 and FIG. 10 demonstrate similar procedures for using system units 1 to communicate with other system units 1 or third party devices to access information. FIG. 9 demonstrates how a Website can be loaded onto a system unit 1; users can then access the data on the portal system unit 1. This allows the system unit 1 to act as a Wi-Fi access point with one or more Websites contained on the system unit 1. As other system units 1 that are programmed to connect to the portal system unit 1 come within a pre-defined geographical range of the portal system unit 1, a connection between the units 1 can be established. This connection can be established automatically or with input from a user. Alternative devices with Wi-Fi, Bluetooth™, NFC, and/or other wireless connection capabilities, such as smart phones or tablets, can also be used to connect to the portal unit 1. During connection establishment, the portal unit 1 can optionally require a password or user credentials to allow a connection. Alternatively, a portal unit 1 can allow connection without requiring any credentials. Once a connection is established, the portal unit 1 can request specific information, such as an e-mail address, user ID, or other information to allow access to the Website contained within the system unit 1. Depending on the contact information provided, such as an e-mail address or telephone number, the system unit 1 can provide different information. If the contact information provided does not match a valid format, the contact information can be re-requested or access can be denied. Once valid information is provided, access to data on the Website can be provided. If the contact information matches that of a pre-registered user or repeat user, the portal unit 1 can provide one set of information; whereas, if the user is a new user, the portal unit 1 provides different information or can request additional information prior to allowing full access to the new user. Information that is provided by the portal unit 1 to a user can also depend on the order that the user connects to the portal device 1. For example, the first ten users can receive a certain set of data or coupons, and all other users receive a different data or coupon set.

If there is no activity within a set period of time, or the devices 1 move too far apart, the connection(s) can be timed out. Multiple connections can exist between a portal unit 1 and other system units 1 or devices at the same time.

FIG. 10 demonstrates a function similar to FIG. 9; however, in FIG. 10, the majority of the data is stored at a pre-configured offsite database or Website. The system units 1 provide a relay function for access to the offsite database. The database is pre-configured to perform certain actions. The relay system units 1 are enabled in a similar fashion as discussed in for FIG. 9, with the additional step of establishing a connection to the offsite database. Alternatively, the connection to the offsite database can be established each time a device connects to a relay system unit 1 and the device or relay system unit 1 requests data from the offsite database. In FIG. 10, the data to be provided is generally located on the offsite server. Some data may be resident on the relay system unit 1. The relay system unit 1 may request information from the device connecting to the relay system unit 1 prior to providing access to the offsite database. Using an external database and connections to it allows for increased data storage and conserving power on relay system units 1. In this configuration, a relay system unit 1 can receive data from a device, save the data to the relay system unit 1, and upload saved data periodically to the offsite database in bulk. Alternatively, a relay system unit 1 can work as a direct relay for communication between a system unit 1 or other device the relay system unit 1 is connected to, and through it the offsite database, system unit 1, or other device.

System units 1 can be programmed to execute functions based on geographical location. A microcontroller 11 can be set active inside or outside of a geofenced area. Geofenced areas can be programmed to a system unit 1 and saved on memory storage unit 14. The geofenced area can be established or maintained through a GPS unit or through other location determination, such as through accelerometers 25, Wi-Fi component 21, cellular component 23, or other components contained within system unit 1. A geofenced area can also be programmed in a central database that informs system units 1 if they are within a geofenced area when a system unit 1 contacts the central database. Once a system unit 1 enters or leaves a geofenced area, the system unit 1 can execute one or more functions or continue to execute functions until the unit 1 leaves the geofenced area. Alternatively, the system unit 1 can be set to stop executing functions based on a geofenced area. Based on the location of a system unit 1, the unit 1 can change from one function to another. An example is where a system unit 1 within a specific geofenced area operates under FIG. 10 as a relay unit 1, but once outside of the geofenced area, changes to operate as a portal unit 1 as illustrated by FIG. 9 or attempts to upload data under guidelines contained in FIG. 6.

A system unit 1 can be used as a navigation tool and for locating items. Within a set area such as a geofenced area that outlines a store or a shopping center, GPS location or facility-based beaconing signal devices can be used to assist in tracking the movements of a system unit 1. The facility-based beaconing system can be a Wi-Fi network that covers the desired area. As a system unit 1 enters this area, the system unit 1 can automatically connect to the Wi-Fi network as a trusted or open Wi-Fi network if the system unit 1 is running any other application. System unit 1 can also have an application loaded that recognizes the particular Wi-Fi network within the geofenced area and continues to run an application for the specific location. This can include reporting the location of the system unit 1 to the Wi-Fi network it is connected to, in addition to the location reporting the system unit 1 conducts for the user. The Wi-Fi network can also activate routines which trigger advertisements or directions to be provided to the user of the system unit 1 as he or she moves through the area covered by the Wi-Fi network. These routines can be triggered when a system unit 1 comes within a certain distance of a sign. For example, the sign can display a message to the system user. Alternatively, as the system unit 1 approaches various pre-selected locations, the system unit 1 can notify the user of a direction to follow, such as to turn right.

A system unit 1 can also provide feedback information to the Wi-Fi network upon reaching certain preselected locations. The location can be a specific fixed location, or the variable location of an object for which the system unit 1 is near. Upon such an occurrence, unit 1 can provide certain information to its user. For example, this information can be an advertisement as a user proceeds within a set distance of a shelf with a product on it. Alternatively, if the user is in a museum, as he or she approaches an exhibit, the system unit 1 can link to information pertinent to the exhibit and provide this information to the user. In either case, the system unit 1 can accomplish the task through various means. One method is for the system unit 1 to have a speaker component that it activates to notify the user by sound. Alternatively, a visual display, such as scrolling text or a screen, can provide the information to the user. The system unit 1 can connect with the facility-based system to trigger displays, ticket/coupon dispensers, lights, or other devices as the system unit 1 approaches them. As the system unit 1 moves away from these locations, the facility-based system can be set to take other actions, such as turn off the lights, or remove the display of the coupons.

A central database can track the location and movements of each system unit 1. This feature can be used in combination with applications to determine the patterns of a system unit 1 user. This can allow targeted advertising to the user. In an example where an application for a grocery list is used by a system user to help find items in a store, the application can link with the store's facility-based system in order to provide the location information of the items sought. The items on the grocery list are then provided to the facility-based system, which can offer advertisements for store branded alternatives for the same items, in addition to providing directions to where the listed items are located. A database can compile information to include where each system unit 1 user goes on each trip and how often trips are made. This information can be used by advertisers to develop profiles to help better advertise to customers, or by retailers to help rearrange products to help increase sales of products.

Additional peripheral devices such as drones, robots, advertising banners, radio controlled vehicles, animal collars, lanyards, or ID holders can be available for purchase such that the microcontroller 11 can be flashed into the appropriate configuration, placed into one of those peripheral devices, and be able to control those peripheral devices using the flashed configuration. Specialized carriers such as clothing, hats, or belts can also be available and can be fully flashable as well. In providing the centralized location of applications, specialized form factors, and the specific peripherals, a microcontroller 11 can provide a myriad of uses from one solution.

Exemplary Embodiments

System unit 1 can be used for numerous different user categories, such as pet owners, first responders, and military personnel; and for conferences, advertising, agricultural uses, and in smart clothing System unit 1 is an easily used IoT device. Exemplary embodiments of system unit 1 include: uploading recorded data to the Internet, including text, pictures, music, and files; downloading data from the Internet; performing network security functions, such as scanning a particular network for vulnerabilities or unauthorized hosts or users; tracking certain objects, including pets and personal property; performing certain tasks when in the presence of a known Wi-Fi hotspot (access point), such as uploading current coordinates, or posting to social media; attaching LEDs to a pet collar, and having microcontroller 11 turn those LEDs on and off in a pattern determined by the programmer.

One embodiment includes a mobile scanning device that searches for Wi-Fi enabled devices. In this embodiment, system unit 1 can be configured to collect information such as date, time, latitude, and longitude about wireless signals and access points, including SSID, BSSID, signal strength, and any encryption algorithm that is used. each time a Wi-Fi signal is detected. For example, unit 1 can be integrated into a hat worn by a security officer, or on the collar of a guard dog, allowing for surreptitious collection of this data as the guard conducts his rounds. A penetration tester can also use this embodiment to conduct security penetration testing of a network, by discretely providing a lanyard that houses a system unit 1 to employees or guests, without need to provide specific further instructions to the wearers.

In another embodiment, unit 1 can be used for tracking a mobile target using wireless connections. When the unit 1 comes across a known or open Wi-Fi hotspot, unit 1 connects to that hotspot and uploads its current GPS location, previously recorded GPS data and time information, and/or other data to the Internet, utilizing a pre-configured Website address and credentials. If unit 1 includes cellular connection capability, unit 1 can periodically post the location of itself, or other pertinent data, to the Internet through this communications medium. A pet owner or researcher can then retrieve the information. The information can then be utilized by a software program to graphically display the activities of the target. This embodiment can include a Website where the pet owner can download new software programs and place those programs onto unit 1 to change the behavior of unit 1.

In yet another embodiment, a system unit 1 can be used to track the location of luggage, and to post that information to the Internet. In some embodiments of the luggage tracker example, a system unit 1 can contain accelerometers 25 to monitor how the luggage has been handled. The system unit 1 can periodically obtain a GPS lock and attempt to connect to a known or open Wi-Fi access point. Once access to the Internet is gained, unit 1 can utilize a preconfigured Website or social media credentials to post the current location of the luggage, which can include GPS location, or provide an airport location if geofencing is enabled. A user can then utilize an Internet-capable device to log in to the Website or social media to check on the current location of the luggage.

A further embodiment includes a first system unit 1 tracking another system unit 1. A group of people can attach a system unit 1 to one of the members of the group (called the "rabbit") to provide location information to other system units 1 (called "foxes") that are part of the group. The rabbit unit 1 can utilize its GPS component 22 and/or accelerometer 25 location tracking capabilities to provide updates of its location at specific time intervals, or upon entering or leaving preselected areas. It then becomes the job of the foxes 1 to attempt to catch the rabbit 1 at a particular location, or to predict the location that the rabbit 1 will frequent next. If a fox 1 fails to catch the rabbit 1, the foxes 1 can be required to perform a penalty action prior to continuing the chase. In this situation, the system unit 1 used by the rabbit 1 can be set to change how often said unit 1 reports information to the chasing foxes 1, based upon how close the foxes 1 are to the rabbit 1.

In another embodiment of the present invention, system units 1 can be set to provide or gather information when each unit 1 establishes a communication link with another system unit 1 or with a third party device, such as a smart phone, tablet, or computer. A product advertising firm or company can host an event to promote their product using this capability. Prior to the event, the promoting company provides each of their representatives with a system unit 1 integrated into a lanyard to be worn by the representative. The lanyard contains a customized, pre-configured Website in the memory storage unit 14 of its unit 1. Using this solution, the firm can create customized Websites containing coupons, pictures, and promotional material stored locally. This helps protect proprietary material and eases control and distribution of the lanyards to the appropriate representatives. This also allows each of the representatives to have customized content in different locations at the same event. The content accessed by each customer using different mediums can have different content on each medium. In this embodiment, the system units 1 used by the advertisers may require pre-configuration of the Website to be displayed.

In another embodiment where system units 1 provide and/or gather information, each system unit 1 communicates with a pre-configured database that is hosted offsite. Each system unit 1 can communicate and pull information from the offsite database. For example, at a job fair, the information can include job listings, documentation required for each position, and hiring manager contact information. As applicants visit employer booths, they can view company information and job lists, similar to how a user can view promotional advertising information in the previous example. The system units 1 can also communicate information to the database, such as accepting an applicant resume and related information and forwarding it to the database. The applicants can then provide their contact information and, if they choose, additional data, through their system units 1 when they meet with the cognizant representative. In this embodiment, a system unit 1 that accepts information from the user can be set to record what information it received, when and where the information was received, and which people wore the unit 1; and retain the information on the system unit 1 and/or immediately forward it to the offsite database. This technique can be used to compare effectiveness of recruiters or representatives. Similarly, this embodiment can be used to build statistics on sales representatives, what they sell, and when sales are made; and to correlate that data with data received from the customers, without having to ask the customer to provide information verbally or through other methods.

In a further embodiment, several system units 1 are programmed to maintain a specific distance from each other, and if the distance is exceeded, a unit 1 that is removed from the group executes specific instructions. This embodiment can be used by people in a crowded event attempting to find their group if they are separated from the group. Units 1 can be set to help direct users to each other, or to a specified location. This embodiment can also be used to maintain an appropriate separation between representatives at events. Alternatively, this embodiment can be used for tracking animals in a herd, or where one animal strays away from the herd. When an animal strays, a program can be executed by a system unit 1 sending a request that activates a drone outfitted with its own system unit 1. The drone then tracks down and follows the wayward animal, and can be programmed to steer the animal back towards the herd, such as by activating a shock collar worn by the animal if the animal continues to move away from the herd.

In another embodiment, several system units 1 can be utilized at a public event, such as a fair, where visitors are outfitted in shirts or other garments that have units 1 embedded in them. Rather than carrying tickets for events, such as ride rides or games, the unit 1 can be registered with the facility, such as an amusement park, upon entry, and associated with a credit card or other payment account. When the visitor enters a ride, the attendant scans the shirt of the visitor to allow the visitor to gain entry. This allows the visitors to use the facilities without having to keep track of tickets or cards.

Figure 11:
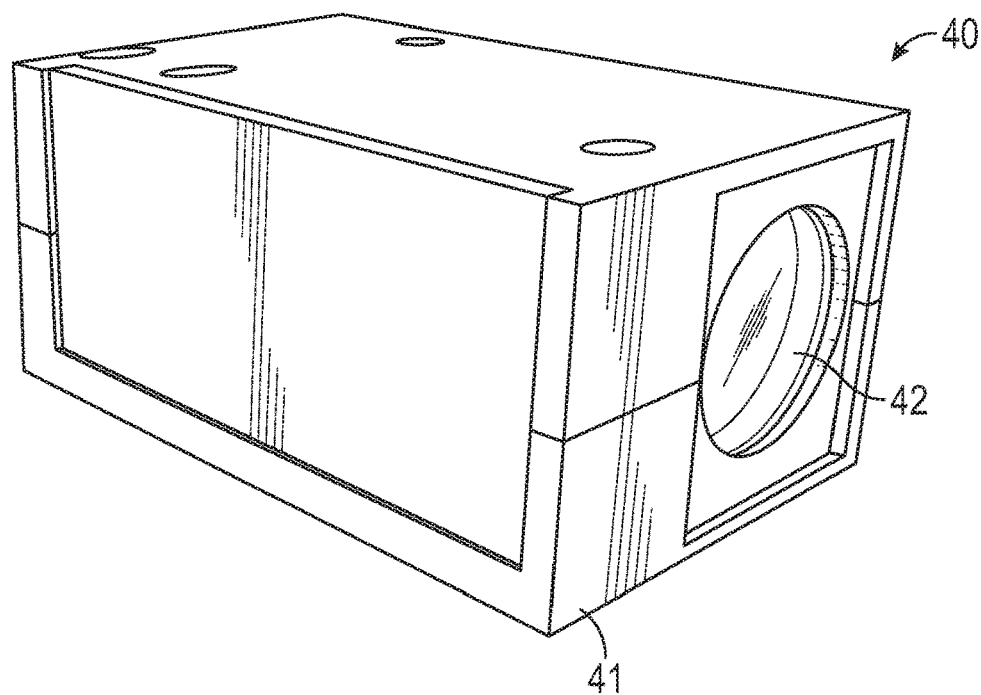
FIG. 11 is an isometric view of a variant of the present invention known as DopeScope 40.
Figure 12:
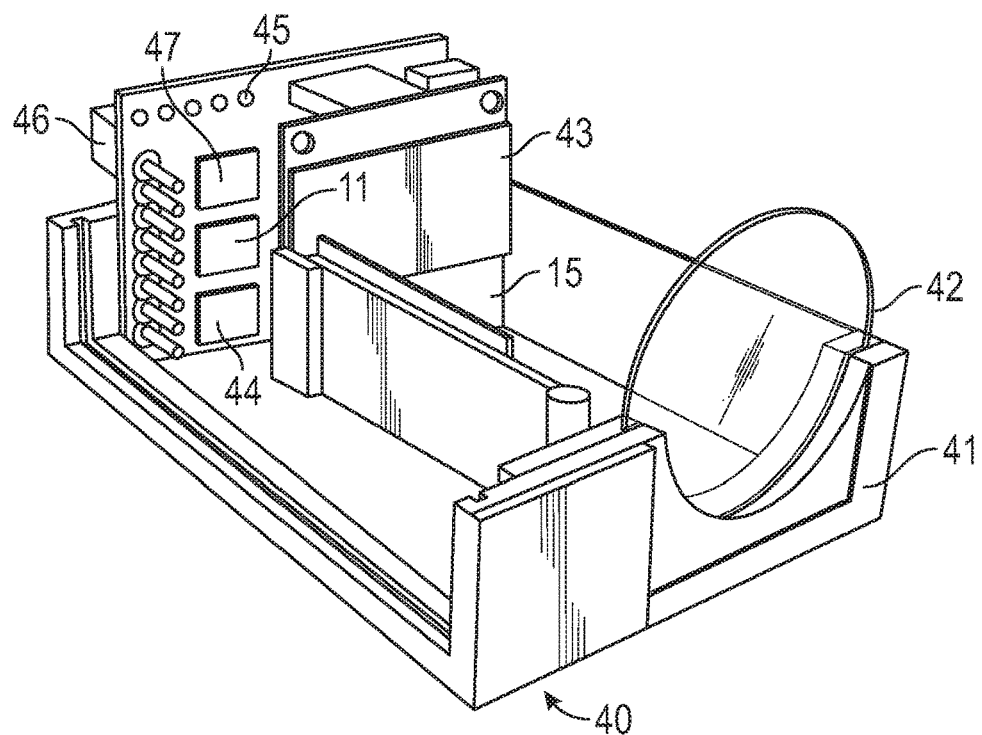
FIG. 12 is an isometric view of DopeScope 40 with part of its housing 41 removed.

An embodiment of the present invention is what we call the 360DopeScope, or DopeScope 40 for short, and is depicted in FIGS. 11 and 12. DopeScope 40 is a portable, user-programmable wireless scanning and network penetration testing device. The base device 40 comprises a 2.4 Ghz transceiving radio 47 and microcontroller 11 with a flexible carrier board 45 containing common interfaces, such as i2c and SPI. Other frequencies can be used, including but not limited to 5 Ghz and Bluetooth frequencies. DopeScope 40 is designed to run either powered off of a Universal Serial Bus (USB) 46, or from a lithium polymer (lipo) battery 15. The USB interface 46 can be used both for recharging the battery 15 and for programming the device 40. Digital-to-analog converters, analog-to-digital converters, modulators, and demodulators can be used to convert the digital signals within the microcontroller 11 to analog signals used by the radio 47, and vice versa.

DopeScope 40 comprises a housing 41 that stores DopeScope 40 including battery 15, antenna corner reflector (RF mirror) 44, small OLED display 43, and short focal length lens 42. The corner reflector 44 increases the device's front-to-back ratio: device 40's reception of wireless signals in front of device 40 are enhanced, while reception of wireless signals behind device 40 are attenuated. OLED display 43 is coupled to microcontroller 11 and offers feedback to the human user by illustrating whatever contents of microcontroller 11 are deemed by the user to be worthy of illustration. Lens 42 serves to magnify the information shown on OLED display 43, and thus allows the user to view objects that appear on display 43 from close proximity, e.g., on the order of 45 mm. This helps keep the size of DopeScope 40 small. The small size of the components allows for DopeScope 40 to function as a monocular device. In this case, the viewer sees information about wireless devices that are relatively "in front of" him/her. In other embodiments, other sizes and housings provide the same functionality, but in ruggedized hand held cases and wearable heads up displays.

Software

Device 40 is programmable through USB interface 46, and contains a number of environments for developing executable code. The code developed has access to most functions of the radio 47, including raw injection of 802.11 frames and the reception of all frames transmitted on a given channel, as well as the ability to run higher level services, such as hosting Web servers and clients. Currently available firmware for device 40 provides for the detection of all nearby broadcasting access points, rogue access points, and other transmitting devices (access points and networking clients).

Expansion

The hardware design of DopeScope 40 allows for user expansion through a carrier board 45 that provides common interfaces for external devices. These interfaces provide access to i2c, SPI, software UART, and a number of General Purpose Input and Output (GPIO) pins. The pins are used in combination for interfacing with external expansion boards. The expansion boards provide a convenient interface to external peripherals, such as Secure Digital and Micro Secure Digital media, compass, GPS, user input, haptic feedback, and other RF devices. The specifications for these boards are made available to the public, enhancing the value of the product 40. Additionally, many primary use boards have been developed by WarCollar Industries, LLC, the Applicant and assignee of the present invention.

Board Design

In some embodiments, the main carrier board 43 comprises four functional units. The primary functional unit is the core computing and RF section 11, 47. An example of a suitable core computing and RF section 11, 47 is an ESP8266 WiFi SOM plus ancillary passive components for configuration and communication. The second functional unit is a USB to UART bridge that provides the user with a programming interface to the device 40 through the standard USB interface 46. The third functional unit is the charging circuitry. This uses the 5v source from the USB interface 46 to properly charge the lithium polymer battery 15 enclosed within the housing 41. Additionally, the third functional unit has under-voltage protection to prevent the battery 15 from draining below the critical threshold for the particular chemistry of the battery 15. The fourth and final functional unit is the set of external peripheral interfaces. This fourth functional unit provides an interface to the OLED screen 43 via i2c, as well as providing the user with interfaces for i2c, SPI, and general purpose I/O.

Case Design

To make the unit 40 user friendly, the DopeScope 40 is housed in a convenient portable case 41. The main carrier board 43 sits toward the back of the case 41, with corner reflector 44 positioned to focus the incoming RF that is arriving in front (to the right in FIGS. 11 and 12) of the user. The display screen 43 is positioned so that lens 42 is at the proper focal length to focus on the screen 43, and the battery 15 and user expansion headers are situated for easy access compartment within case 41.

All of the components described herein can be implemented in software, firmware, or hardware, or any combination thereof. The systems and methods described herein can be implemented using one or more computing devices, which may or may not be physically or logically separate from each other. The methods may be performed by components arranged as either on-premise hardware, on-premise virtual systems, or hosted-private instances. Additionally, various aspects of the methods described herein may be combined or merged into other functions. Example computerized systems for implementing the invention are illustrated in FIG. 1 and FIG. 2. A microprocessor or microcontroller 11 can be configured to particularly perform some or all of the method steps described herein. In some embodiments, the method can be partially or fully automated by one or more computers or processors. In some embodiments, the illustrated system elements can be combined into a single hardware device or separated into multiple hardware devices. If multiple hardware devices are used, the hardware devices can be physically located proximate to or remote from each other. The embodiments of the methods described and illustrated are intended to be illustrative and not to be limiting. For example, some or all of the steps of the methods can be combined, rearranged, and/or omitted in different embodiments.

The system may include one or more processors. The processor(s) may be connected to a communication infrastructure, such as but not limited to, a communications bus, cross-over bar, network, etc. The processes and processors need not be located at the same physical locations. In other words, processes can be executed at one or more geographically distant processors, over, for example, a LAN or WAN connection. Computing devices may include a display interface that may forward graphics, text, and other data from the communication infrastructure for display on a display unit.

The computing system may also include, but not be limited to, a main memory, random access memory (RAM), and a secondary memory, etc. The secondary memory may include, for example, a hard disk drive and/or a removable storage drive, such as a compact disk drive CD-ROM, etc. The removable storage drive may read from and/or write to a removable storage unit. As may be appreciated, the removable storage unit may include a computer usable storage medium having stored therein computer software and/or data. In some embodiments, a machine-accessible medium may refer to any storage device used for storing data accessible by a computer.

The processor may also include, or be operatively coupled to communicate with, one or more data storage devices for storing data. Such data storage devices can include, as non-limiting examples, magnetic disks (including internal hard disks and removable disks), magneto-optical disks, optical disks, read-only memory, random access memory, and/or flash storage. Storage devices suitable for tangibly embodying computer program instructions and data can also include all forms of non-volatile memory, including, for example, semiconductor memory devices, such as EPROM, EEPROM, and flash memory devices; magnetic disks such as internal hard disks; and removable disks. The processor and the memory can be supplemented by, or incorporated in, ASICs (application-specific integrated circuits).

The processing system can be in communication with a computerized data storage system. The data storage system can include a non-relational or relational data store, such as a MySQL™ or other relational database. Other physical and logical database types can be used. The data store may be a database server, such as Microsoft SQL Server™, Oracle™, IBM DB2™, SQLITE™, or any other database software, relational or otherwise. The data store may store the information by identifying syntactical tags and any information required to operate on syntactical tags. In some embodiments, the processing system may use object-oriented programming and may store data in objects. In these embodiments, the processing system may use an object-relational mapper (ORM) to store the data objects in a relational database. The systems and methods described herein can be implemented using any number of physical data models. In one example embodiment, an RDBMS can be used. In those embodiments, tables in the RDBMS can include columns that represent coordinates. In the case of economic systems, data representing companies, products, etc. can be stored in tables in the RDBMS. The tables can have pre-defined relationships between them. The tables can also have adjuncts associated with the coordinates.

In alternative exemplary embodiments, secondary memory may include other similar devices for allowing computer programs or other instructions to be loaded into a computer system. Such devices may include, for example, a removable storage unit and an interface. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket, and other removable storage units and interfaces, which may allow software and data to be transferred from the removable storage unit to computer system.

The computing device may also include an input device such as, but not limited to, a mouse or other pointing device such as a digitizer, and a keyboard or other data entry device (not shown). The computing device may also include output devices, such as, but not limited to, a display, and a display interface. The computing device may include input/output (I/O) devices, such as but not limited to, a communications interface, cable and communications path, etc. These devices may include, but are not limited to, a network interface card, and modems. The communications interface may allow software and data to be transferred between the computer system and external devices.

In one or more embodiments, the present embodiments are practiced in the environment of a computer network or networks. The network can include a private network, a public network (for example the Internet, as described below), or a combination of both. The network can include hardware, firmware, software, or any combination thereof.

From a telecommunications-oriented view, the network can be described as a set of hardware nodes interconnected by a communications facility, with one or more processes (hardware, firmware, software, or any combination thereof) functioning at each such node. The processes can intercommunicate and exchange information with one another via communication pathways between them using interprocess communication pathways. On these pathways, appropriate communications protocols are used.

An exemplary computer and/or telecommunications network environment in accordance with the present embodiments may include nodes, which may include hardware, firmware, software, or any combination thereof. The nodes may be interconnected via a communications network. Each node may include one or more processes, executable by processors incorporated into the nodes. A single process may be run by multiple processors, or multiple processes may be run by a single processor, for example. Additionally, each of the nodes may provide an interface point between the network and the outside world, and may incorporate a collection of sub-networks.

In an exemplary embodiment, the processes may communicate with one another through interprocess communication pathways supporting communication through any communications protocol. The pathways may function in sequence or in parallel, continuously or intermittently. The pathways can use any of the communications standards, protocols, or technologies described herein with respect to a communications network, in addition to standard parallel instruction sets used by many computers.

Communications between the nodes may be made possible by a communications network. A node may be connected either continuously or intermittently with a communications network. As an example, in the context of the present invention, a communications network can be a digital communications infrastructure providing adequate bandwidth and information security.

The communications network can include wireline communications capability, wireless communications capability, or a combination of both, at any frequencies, using any type of standard, protocol, or technology. In addition, in the present embodiments, the communications network can be a private network (for example, a VPN) or a public network (for example, the Internet).

A non-inclusive list of exemplary wireless protocols and technologies used by a communications network includes BlueTooth™, general packet radio service (GPRS), cellular digital packet data (CDPD), mobile solutions platform (MSP), multimedia messaging (MMS), wireless application protocol (WAP), code division multiple access (CDMA), short message service (SMS), wireless markup language (WML), handheld device markup language (HDML), binary runtime environment for wireless (BREW), radio access network (RAN), and packet switched core networks (PS-CN). Also included are various generation wireless technologies. An exemplary non-inclusive list of primarily wireline protocols and technologies used by a communications network includes asynchronous transfer mode (ATM), enhanced interior gateway routing protocol (EIGRP), frame relay (FR), high-level data link control (HDLC), Internet control message protocol (ICMP), interior gateway routing protocol (IGRP), Internetwork packet exchange (IPX), ISDN, point-to-point protocol (PPP), transmission control protocol/Internet protocol (TCP/IP), routing information protocol (RIP), and user datagram protocol (UDP). As skilled persons will recognize, any other known or anticipated wireless or wireline protocols and technologies can be used.

Embodiments of the present invention may include apparati for performing the operations described herein. An apparatus may be specially constructed for the desired purposes, or it may comprise a general purpose device selectively activated or reconfigured by a program stored in the device.

In one or more embodiments, the functions are embodied in machine-executable instructions. The instructions can be used to cause a processing device, for example a general-purpose or special-purpose processor, which is programmed with the instructions, to perform the steps of the present invention. Alternatively, the steps of the present invention can be performed by specific hardware components that contain hardwired logic for performing the steps, or by any combination of programmed computer components and custom hardware components. For example, the present invention can be provided as a computer program product, as outlined above. In this environment, the embodiments can include a machine-readable medium having instructions stored on the medium. The instructions can be used to program any processor or processors (or other electronic devices) to perform a process or method according to the described exemplary embodiments. In addition, one or more methods of the present invention can also be downloaded and stored on a computer program product. Here, the program can be transferred from a remote computer (e.g., a server) to a requesting computer (e.g., a client) by way of data signals embodied in a carrier wave or other propagation medium via a communication link (e.g., a modem or network connection), and ultimately such signals may be stored on the computer systems for subsequent execution.

The methods of the present invention can be implemented in a computer program product accessible from a computer-usable or computer-readable storage medium that provides program code for use by or in connection with a computer or any instruction execution system. A computer-usable or computer-readable storage medium can be any apparatus that can contain or store the program for use by or in connection with the computer or instruction execution system, apparatus, or device.

A data processing system suitable for storing and/or executing the corresponding program code can include at least one processor coupled directly or indirectly to computerized data storage devices such as memory elements. Input/output (I/O) devices (including but not limited to keyboards, displays, pointing devices, etc.) can be coupled to the system. Network adapters may also be coupled to the system to enable the data processing system to become coupled to other data processing systems, remote printers, or storage devices through intervening private or public networks. To provide for interaction with a user, the features can be implemented on a computer with a display device, such as an LCD (liquid crystal display), or another type of monitor for displaying information to the user, and a keyboard and an input device, such as a mouse or trackball by which the user can provide input to the computer.

A computer program as described herein can be a set of instructions that can be used, directly or indirectly, in a computer. The systems and methods described herein can be implemented using programming languages such as Flash™, JAVA™, C++, C, C#, Python, Visual Basic™, JavaScript™ PHP, XML, HTML, etc., or any combination of programming languages, including compiled or interpreted languages, and can be deployed in any form, including as a stand-alone program or as a module, component, subroutine, or other unit suitable for use in a computing environment. The software can include, but not be limited to, firmware, resident software, microcode, etc. Protocols such as SOAP/HTTP may be used in implementing interfaces between programming modules. The components and functionality described herein may be implemented on any desktop operating system executing in a virtualized or non-virtualized environment, using any programming language suitable for software development, including, but not limited to, different versions of Microsoft Windows™, Apple™ Mac™, iOS™ Unix™/X-Windows™, Linux™, Android™, etc. The system can be implemented using a Web application framework, such as Ruby on Rails.

Suitable processors for the execution of a program of instructions include, but are not limited to, general and special purpose microprocessors, and a sole processor or one of multiple processors or cores, of any kind of computer. A processor may receive and store instructions and data from a computerized data storage device such as a read-only memory, a random access memory, both, or any combination of the data storage devices described herein. A "processor" may include any processing circuitry or control circuitry operative to control the operations and performance of an electronic device.

The systems, modules, and methods described herein can be implemented using any combination of software, firmware, or hardware elements. The systems, modules, and methods described herein can be implemented using one or more virtual machines operating alone or in combination with one other. Any applicable virtualization solution can be used for encapsulating a physical computing machine platform into a virtual machine that is executed under the control of virtualization software running on a hardware computing platform or host. The virtual machine can have both virtual system hardware and guest operating system software.

The systems and methods described herein can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the myriad computers and networks that form the Internet.

One or more embodiments of the invention may be practiced with other computer system configurations, including hand-held devices, microprocessor systems, microprocessor-based or programmable consumer electronics, minicomputers, mainframe computers, etc. The invention may also be practiced in distributed computing environments where tasks are performed by remote processing devices that are linked through a network.

The terms "computer program medium" and "computer readable medium" may be used to generally refer to media such as, but not limited to, a removable storage drive, or a hard disk installed in hard disk drive. These computer program products may provide software to a computer system. The invention may be directed to such computer program products.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," does not necessarily refer to the same embodiment.

In the present written description and claims, the terms "coupled" and "connected," along with their derivatives, may be used. It should be understood that these terms may be not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm may be described herein, and generally considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities, and are merely convenient labels applied to these quantities.

Unless specifically stated otherwise, it may be appreciated that throughout the specification, terms such as "processing," "computing," "calculating," "determining," or the like, refer to the action and/or processes of a computer or computing system, or a similar electronic computing device, that manipulate and/or transform data represented as physical, such as electronic, quantities within the registers of a computing system and/or memories into other data similarly represented as physical quantities within the memories of a computing system, registers, or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. The terms "system" and "method" are used herein interchangeably insofar as the system may embody one or more methods and the methods may be considered as a system.

While one or more embodiments of the invention have been described, various alterations, additions, permutations, and equivalents thereof are included within the scope of the invention.

In the description of embodiments, reference is made to the accompanying drawings that form a part hereof, which show by way of illustration specific embodiments of the claimed subject matter. It is to be understood that other embodiments may be used, and that changes or alterations, such as structural changes, may be made. Such embodiments, changes, or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures can also be executed in different orders. Additionally, various computations that are used herein need not be performed in the order disclosed, and other embodiments using alternative orderings of the computations can be readily implemented. In addition to being reordered, the computations can also be decomposed into sub-computations with the same results.

What is claimed is:

1. A method for surreptitiously scanning for Wi-Fi access points, said method comprising:
    hiding a device comprising a microcontroller, a radio, and an antenna within a wearable item;
    activating the radio to receive RF signals proximate the device;
    invoking a Wi-Fi detector to recognize Wi-Fi access point signatures among the RF signals received by the radio; and
    for each recognized Wi-Fi access point signature, storing SSID, BSSID, signal strength, and encryption algorithm information associated with the corresponding access point;
    wherein the device further comprises an RF reflective mirror in RF communication with the antenna, wherein the mirror is configured to enhance reception of RF signals entering the device from a first direction while attenuating RF signals entering the device from a second direction opposite the first direction.

2. A method for enabling a plurality of users to surreptitiously communicate with a digital database, said method comprising:
    distributing a plurality of small digital computers, hidden in wearable items, to the users;
    equipping each computer with a radio and an antenna; and
    enabling each user to activate one of the radios to exchange digital data with the database; wherein
    there is an assembly of several such small digital computers programmed to maintain a pre-established distance from each other, said assembly configured to provide that, when the pre-established distance is exceeded, a computer that has exceeded said distance sends an instruction to activate a drone that has been outfitted with its own computer having the characteristics of each of the plurality of small digital computers.

* * * * *